Figure 1:
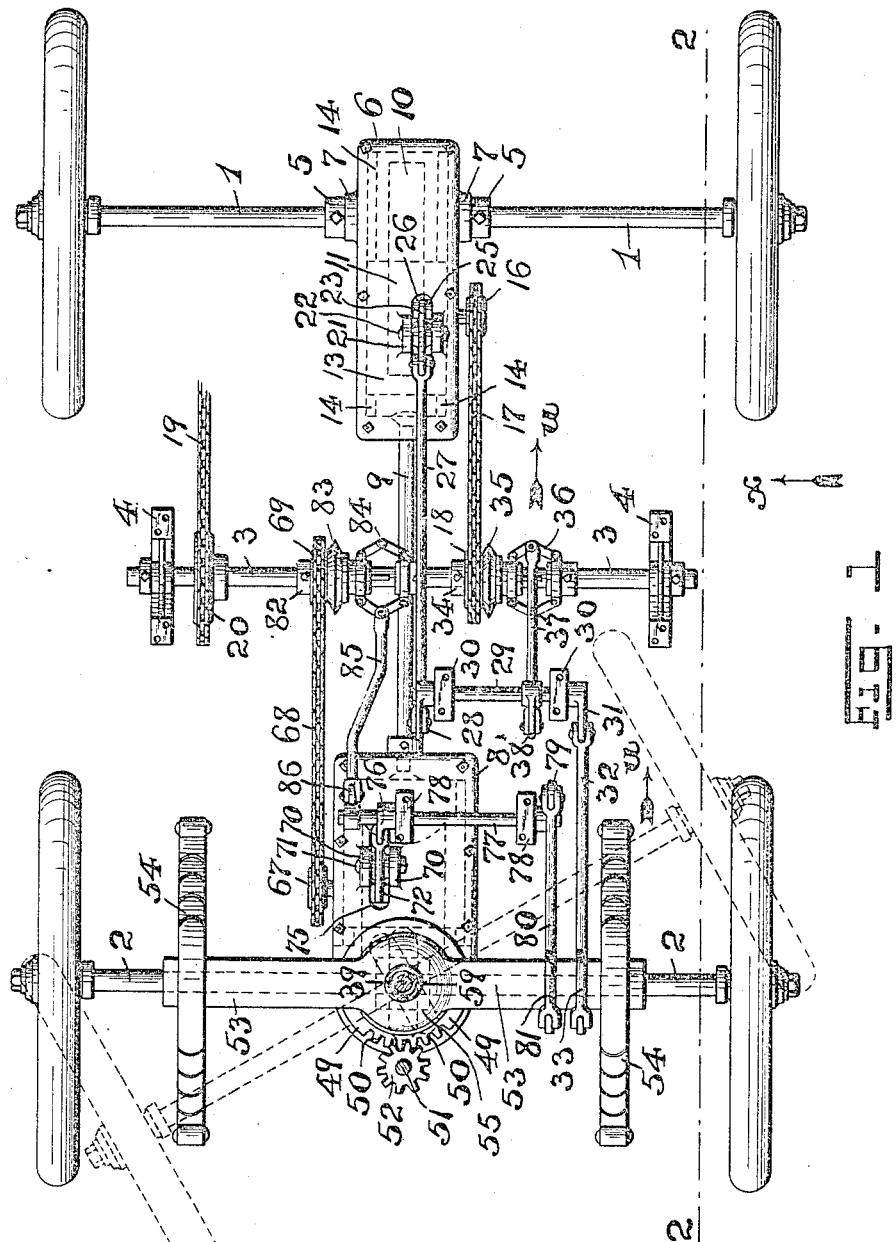

No. 787,096. PATENTED APR. 11, 1905.
S. H. HANSON.
POWER TRANSMISSION FOR MOTOR VEHICLES.
APPLICATION FILED MAY 10, 1904.

3 SHEETS—SHEET 1.

WITNESSES:
Geo. D. Richards
W. B. Fraentzel

INVENTOR:
Stephen H. Hanson,
BY
Fred C. Fraentzel.
ATTORNEY

No. 787,096. PATENTED APR. 11, 1905.
S. H. HANSON.
POWER TRANSMISSION FOR MOTOR VEHICLES.
APPLICATION FILED MAY 10, 1904.
3 SHEETS—SHEET 2.
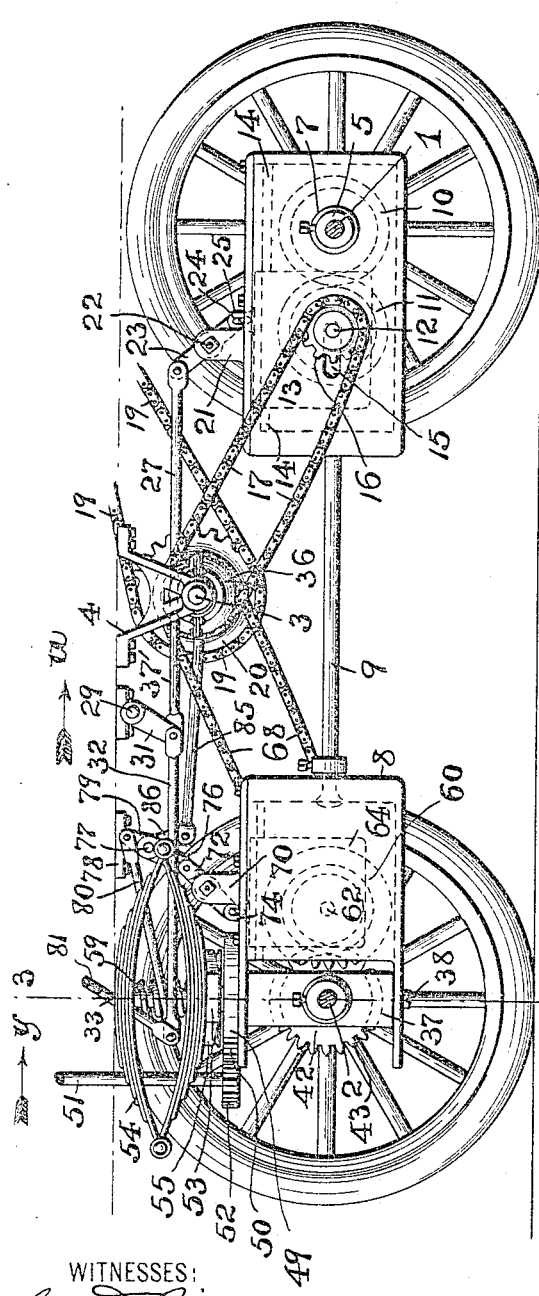
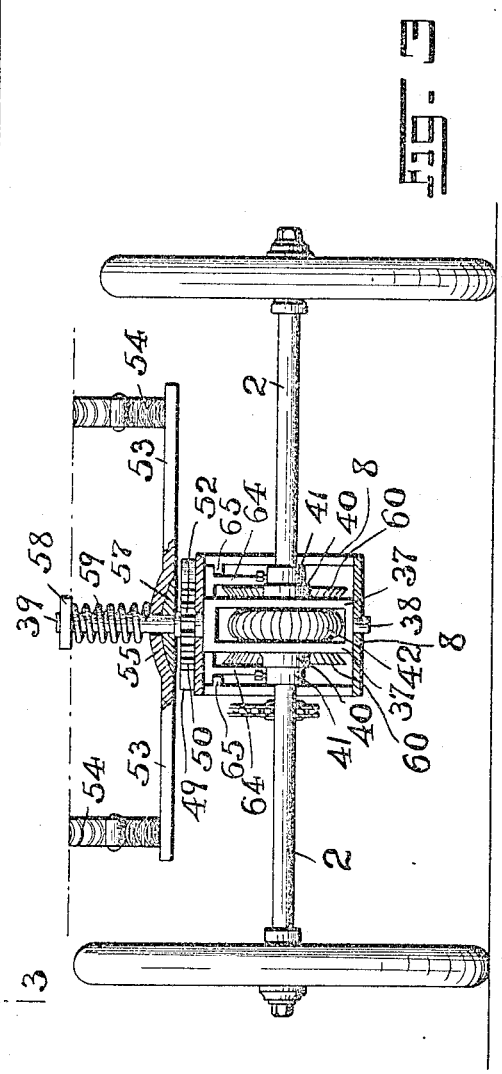
WITNESSES:
Geo. D. Richards
W. B. Fraentzel
INVENTOR:
Stephen H. Hanson,
BY
Fred K. Fraentzel,
ATTORNEY

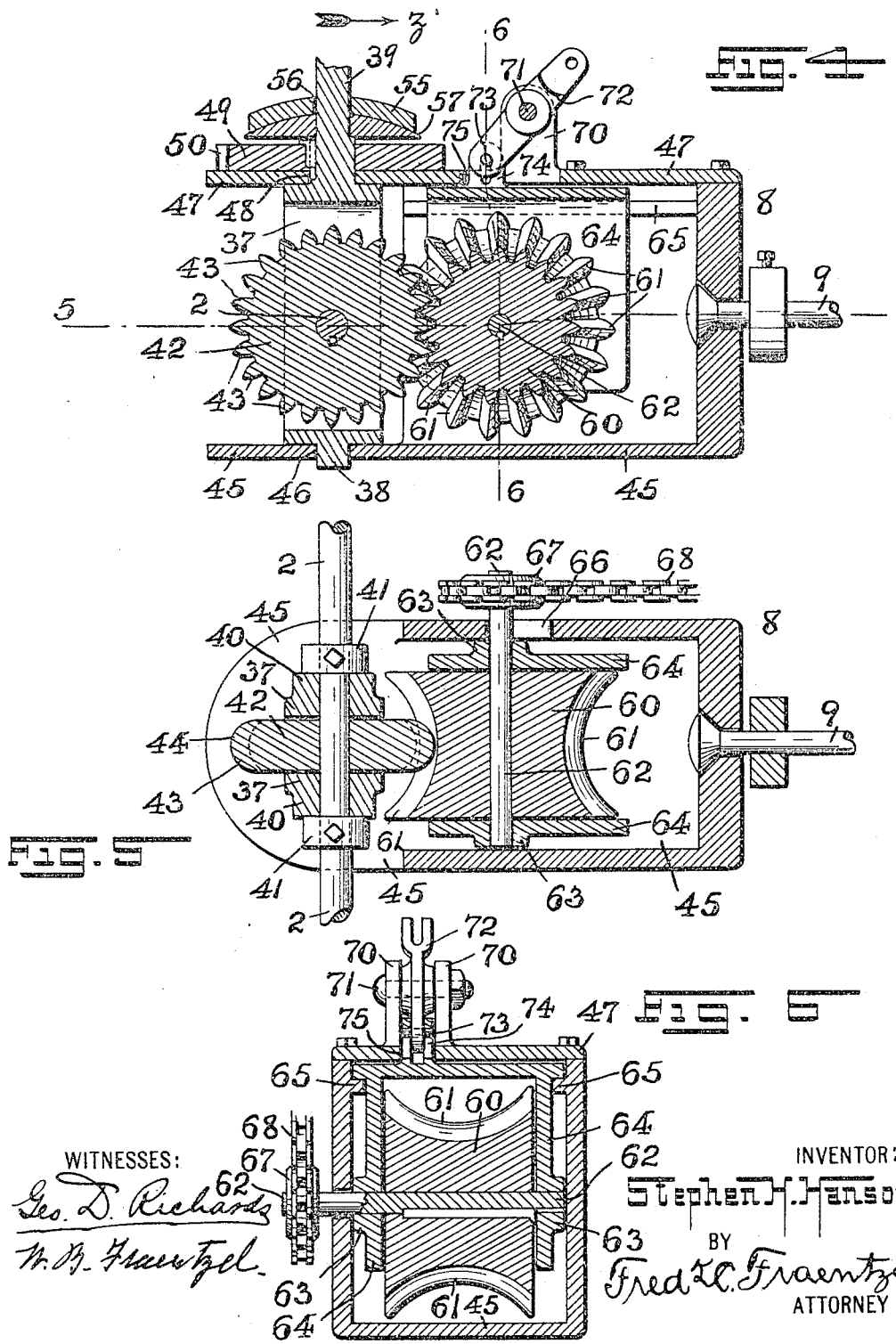

No. 787,096.

Patented April 11, 1905.

UNITED STATES PATENT OFFICE.

STEPHEN H. HANSON, OF AKRON, OHIO.

POWER-TRANSMISSION FOR MOTOR-VEHICLES.

SPECIFICATION forming part of Letters Patent No. 787,096, dated April 11, 1905.

Application filed May 10, 1904. Serial No. 207,236.

*To all whom it may concern:*

Be it known that I, STEPHEN H. HANSON, a citizen of the United States, residing at Akron, in the county of Summit and State of Ohio, have invented certain new and useful Improvements in Power-Transmission for Motor-Vehicles; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference to improvements in power-transmission devices or apparatus to be used with motors of the various kinds, whether steam, gasolene, or electric, employed with the various classes and kinds of motor-vehicles for conveying the power generated from such motor to an axle of the vehicle; and the present invention has for its principal object to provide a novel transmission device or mechanism for motor-vehicles of the various kinds for transmitting the generated power from the motor or engine either to the rear axle or to the front axle of the vehicle, or, if desired, applying the power to both axles of the vehicle at one and the same time.

A further object of this invention is to provide a power-transmitting mechanism or device for automobiles whereby the generated power is equally distributed and applied upon both axles of the vehicle and the arrangement of the mechanism being such that certain parts can be forced out of gear with the rear axle or with the front axle, as desired, and whereby the power may be transmitted singly to either one of the axles of the vehicle.

A further object of this invention is to provide a novel power-transmitting device or mechanism for automobiles and similar power-driven vehicles, the device being so arranged that the power can be transmitted directly to the front axle of the vehicle and that without interfering with the horizontal rotary movements of the said axle while in the act of turning the vehicle.

Other objects of this invention will be evident more particularly from the following detailed description of the same.

My invention consists in the novel power-transmitting device or mechanism for automobiles and other power-driven vehicles to be hereinafter more particularly described; and, furthermore, this invention consists in the various arrangements and combinations of devices and parts, all of which will be hereinafter more fully set forth and then finally embodied in the clauses of the claim which is appended to and which forms an essential part of this specification.

The invention is clearly illustrated in the accompanying drawings, in which—

Figure 1 is a top or plan view of the lower skeleton frame of a vehicle, illustrating the rear and front axles and their wheels, with an auxiliary driving-shaft and the power-transmitting device or mechanism embodying the principles of my present invention. Fig. 2 is a longitudinal vertical section taken on line 2 2 in said Fig. 1 looking in the direction of the arrow $x$, the said view representing the power-transmitting device or mechanism in side elevation. Fig. 3 is a front elevation and part transverse vertical section taken on line 3 3 in said Fig. 2 of the drawings and looking in the direction of the arrow $y$ in said figure. Fig. 4 is a longitudinal vertical section of one of a pair of gear devices employed with my novel form of power-transmitting device or mechanism. Fig. 5 is a horizontal section of the same, taken on line 5 5 in said Fig. 4; and Fig. 6 is a transverse vertical section taken on line 6 6 in said Fig. 4 looking in the direction of the arrow $z$.

Similar characters of reference are employed in the above-described views to indicate corresponding parts.

Referring now to the several figures of the drawings, the reference character 1 indicates the rear axle, and 2 the front axle, of any suitable construction of motor-vehicle, both of said axles being of the kind that revolve in bearings and have their wheels secured to the axles that they revolve with the axles, the reference character 3 indicating an auxiliary shaft, which is rotatably arranged in the bearings of suitable brackets 4, which may be secured to the body or any other suitable part of the vehicle, these parts, however, not being represented in the accompanying drawings.

From an inspection of Figs. 1 and 2 of the drawings it will be seen that I have arranged upon the rear axle 1, between a pair of collars 5 or other retaining devices, a box or frame or casing 6 of any suitable construction, which is provided in its sides with a pair of tubular hubs or bearings 7, in which the said axle 1 is capable of revolving. Operatively connected with the front axle 2 is another box, frame, or casing, 8, to be hereinafter more fully described, the two boxes, frames, or casings 6 and 8 being connected, by means of a reach 9 or any other connecting means, in any suitable manner. Suitably affixed upon that portion of the said rear axle 1 within the said box, frame, or casing 6 is a gear 10, and in separable mesh with the said gear 10 is a gear 11. This gear 11 is affixed to a shaft or spindle 12, rotating in suitable bearings connected with a sliding frame 13, arranged to slide or reciprocate upon ways or guides 14 (indicated in dotted outline in said Figs. 1 and 2) and the one end of said shaft or spindle 12 extending through an elongated hole or opening 16 in the side of the casing, frame, or box 6. The said shaft or spindle 12 is provided with a sprocket-wheel 16, which receives its motion from a link chain 17 passing over a sprocket-wheel 18 upon the auxiliary shaft 3. This shaft 3 is driven from any suitable source of motive power by means of a link chain 19 passing over a sprocket-wheel 20 upon the said shaft 3. That the said gear 11 may be thrown in and out of mesh with the gear 10 the said box, frame, or casing 6 is provided with a pair of upwardly-extending posts 21, having a pin 22, with which is connected a lever or arm 23. The lower end portion of said lever or arm 23 has a pin 24 movably arranged in a slotted post 25, connected with the said sliding frame 13, the said post 25 extending through an elongated opening 26 in the said box, frame, or casing 6. Pivotally connected with the upper end portion of said lever or arm 23 is a rod 27, which is pivotally connected at its opposite end to a crank or arm 28 of a spindle 29, the said spindle oscillating in bearings 30, which may be connected with the body or other part of the vehicle. The said spindle 29 is provided with a second crank-arm 31, with which is connected a system of operating-levers 32 and 33 to be operated by the person seated in the vehicle, whereby a movement of the lever 32 in the direction of the arrows $u$ in Figs. 1 and 2 will produce a reverse movement of the sliding frame 13, and thereby disengages the gear 11 from its operative mesh with the gear 10, as will be evident from an inspection of said Fig. 2 of the drawings. From Fig. 1 it will be seen that ordinarily the sprocket-wheel 18 is loosely held upon the auxiliary spindle or shaft 3 between a collar 34, and a friction-disk 35, the latter causing the said wheel 18 to turn with the said spindle or shaft 3 when the parts of a clutch device 36 are in the positions indicated in said Fig. 1. The said clutch device is actuated from a rod 37', which is attached to a crank-arm 38', also secured to the spindle 29, and it will thus be evident from an inspection of said Figs. 1 and 2 that when the gear 11 is withdrawn from the gear 10 the said friction-disk 35 is withdrawn from its holding or frictional contact with the sprocket-wheel 18 and the latter will be brought into its inoperative relation with the auxiliary shaft or spindle 3. The preferred manner of operatively connecting the other box, frame, or casing, 8, to the front axle 2 of the vehicle is by means of an open frame 37, preferably of a rectangular cross-section, as illustrated, the said frame being provided upon its under side with a downwardly-extending pivot or stud 38 and having upon its upper side an upwardly-extending post 39. The said frame 37 is also provided upon its opposite sides with a pair of tubular hubs 40, forming bearings in which the axle 2 is free to revolve, a pair of collars 41 upon the said axle 2 preventing a side movement of the said frame 37 upon said axle. Suitably secured upon the axle 2 and in the opening formed by the said frame 37 is a gear-wheel 42, the gear-teeth 43 of this wheel having circular edges 44, substantially as illustrated. The box, frame, or casing 8, which is made, preferably, in the manner illustrated in Figs. 4, 5, and 6, is provided in its bottom 45 with a perforation 46, in which the pivot or stud 38 is arranged so as to turn therein, and the post 39 extends through a perforation 48 in the upper plate 47 of said box, frame, or casing 8. Suitably secured upon the said post 39 and directly above the outer surface of the said plate 47 is a disk or plate 49, provided with gear-teeth 50, with which are in engagement the teeth of a pinion 52, secured to a steering-rod 51, whereby the said front axle can be turned horizontally, as indicated in the dotted outline in said Fig. 1 of the drawings. These various parts, as will be seen from an inspection more especially of Fig. 3 of the drawings, are supported beneath the lower surface of a frame 53, which is suspended beneath the body of the vehicle in any suitable manner, and preferably by means of springs, as 54. A cupped or depressed portion 55 of the said frame 53 is made with a perforation 56, through which the said post 39 extends, and the said cupped or depressed portion 55 has extending into it a supporting plate or disk 57, which is secured to said post 39 and has its upper convex surface in oscillatory relation with the lower concave surface of the said frame 53, as illustrated. Between a flange, collar, or nut 58 upon the said post 39 and the upper surface of the part 55 of said frame 53 I have arranged a spring 59, which encircles the said rod 39 to take up any undue vibratory action when passing over rough roads. In separable mesh with the said gear 42 upon the said front axle 2 is a gear 60, having concaved gear-teeth 61, so as to permit of the horizontal rotary or swinging movement of the axle 2 without throwing the gears 42 and 60 out of engagement when the front axle 2 is being driven directly from the said gear 60. This gear 60 is affixed to a shaft or spindle 62, rotating in suitable bearings 63, connected with a sliding frame 64, arranged to slide or reciprocate upon ways or guides 65, as indicated, and the one end of the said shaft or spindle 62 extending through an elongated hole or opening 66 in the said box, frame, or casing 8. The said shaft or spindle 62 is provided with a sprocket-wheel 67, which receives its motion from a link chain 68 passing over a sprocket-wheel 69 upon the said auxiliary shaft 3. That the said gear 60 may be thrown in and out of mesh with the gear 42 the said box, frame, or casing 8 is provided with a pair of upwardly-extending posts 70, having a pin 71 with which is connected a lever or arm 72. The lower end portion of said lever or arm has a pin 73 movably arranged in a slotted post 74, connected with the said sliding frame 64, the said post extending through an elongated opening 75 in the said box, frame, or casing 8. Pivotally connected with the upper end portion of the lever or arm 72 is a crank-arm 76, extending from a spindle 77, oscillating in bearings 78, which may be connected with the body or other part of the vehicle. The said spindle 77 is provided with a second crank-arm 79, with which is connected a system of levers 80 and 81 to be operated by the person seated in the vehicle, whereby a movement of the lever 80 in the direction of the arrows $u$ in Figs. 1 and 2 will produce a reverse movement of the sliding frame 64, and thereby disengages the gear 60 from its operative mesh with the gear 42.

The sprocket-wheel 69 is loosely held upon the spindle or shaft 3 between a collar 82 and a friction-disk 83, the latter causing the said wheel 69 to turn with the said spindle or shaft 3 when the parts of a clutch device 84 are in the positions indicated in said Fig. 1 of the drawings. The said clutch device 84 is actuated from a rod 85, which is attached to a crank-arm 86, also secured to the said spindle 77. It will thus be evident that when the gear 60 is withdrawn from its engagement with the gear 42 the said friction-disk 83 is also withdrawn from its frictional holding contact with the said sprocket-wheel 69 and the latter is brought into its inoperative relation with the auxiliary shaft or spindle 3.

From the foregoing description of my present invention it will be seen that I have devised a simple and operatively-constructed power-transmitting mechanism or device for automobiles and other power-driven vehicles by means of which the power can be applied singly to either the front or the rear axle of the vehicle or the power can be applied to both axles at the same time. By an arrangement of the friction-disks and clutch devices upon the auxiliary shaft the sprocket-wheels upon said shaft and the link chains passing over said sprocket-wheels can be brought in inoperative relation with the said auxiliary shaft, the advantages of which are clearly evident.

I am aware that changes may be made in the arrangements and combinations of the various devices and their parts, as well as in the details of the construction of the same, without departing from the scope of my present invention. Hence I do not limit my invention to the exact arrangements and combinations of the devices and parts as described in the foregoing specification and as illustrated in the accompanying drawings, nor do I confine myself to the exact details of the construction of any of the said parts. The arrangemnt of the separable gears in each box, frame, or casing 6 or 8 may also be departed from, if desired, and in some instances I may provide with each box, frame, or casing more than two gears, employing a train of gears in each box, frame or casing, according to the existing conditions in the various classes and kinds of vehicles and according to the kinds of engines or motors employed for driving the vehicles.

Having thus described my invention, what I claim is—

1. In a motor-vehicle, the combination, with an axle, adapted to revolve in bearings and having a horizontally and centrally pivotal motion, a gear on said axle, a frame journaled on said axle, a sliding gear in said frame in separable engagement with the gear on said shaft, means for actuating said sliding gear, and means for producing the disengagement of said gears, substantially as and for the purposes set forth.

2. In a motor-vehicle, the combination, with an axle, adapted to revolve in bearings and having a horizontally and centrally pivotal motion, a gear on said axle, a frame journaled on said axle, a sliding gear in said frame in separable engagement with the gear on said shaft, means for actuating said sliding gear, and means for producing the disengagement of said gears, consisting, essentially, of a slide in said box, and a system of actuating-levers connected with said slide by means of which said slide may be moved, substantially as and for the purposes set forth.

3. In a motor-vehicle, the combination, with a horizontally-turning axle, a gear on said axle, a frame journaled on said axle, a box pivotally connected with said frame, a sliding gear in said box in separable engagement with the gear on said shaft, means for actuating said sliding gear, means for producing a pivotal movement of said box upon said frame, and means for producing the disengagement of said gears, substantially as and for the purposes set forth.

4. In a motor-vehicle, the combination, with a horizontally-turning axle, a gear on said axle, a frame journaled on said axle, a box pivotally connected with said frame, a sliding gear in said box in separable engagement with the gear on said shaft, means for actuating said sliding gear, means for producing a pivotal movement of said box upon said frame, and means for producing the disengagement of said gears, consisting, essentially, of a slide in said box, and a system of actuating-levers connected with said slide by means of which said slide may be moved, substantially as and for the purposes set forth.

5. In a motor-vehicle, the combination, with a horizontally-turning axle, a gear on said axle having gear-teeth provided with convex edges, a box connected with said axle, a sliding gear in said box in separable engagement with the gear on said shaft, said sliding gear having concaved gear-teeth, means for actuating said sliding gear, and means for producing the disengagement of said gears, substantially as and for the purposes set forth.

6. In a motor-vehicle, the combination, with a horizontally-turning axle, a gear on said axle having gear-teeth provided with convex edges, a box connected with said axle, a sliding gear in said box in separable engagement with the gear on said shaft, said sliding gear having concaved gear-teeth, means for actuating said sliding gear, and means for producing the disengagement of said gears, consisting, essentially, of a slide in said box, and a system of actuating-levers connected with said slide by means of which said slide may be moved, substantially as and for the purposes set forth.

7. In a motor-vehicle, the combination, with the front and rear axles of the vehicle, adapted to revolve in bearings, and said front axle having a horizontally and centrally pivotal motion, of a power-driven shaft, a pair of sprocket-wheels on said shaft, a clutch-disk in engagement with each sprocket-wheel, means for producing the disengagement of said clutch-disks from said sprocket-wheels, a driving-gear on said rear axle, a box journaled on said axle, a sliding gear in said box in separable engagement with the gear on said rear axle, a sprocket-wheel connected with said sliding gear, and a link chain passing over said sprocket-wheel and over one of the sprocket-wheels on said power-driven shaft, a driving gear on said front axle, a box connected with said front axle, a sliding gear in said box in separable engagement with said gear on said front axle, a sprocket-wheel connected with said sliding gear, and a link chain passing over said sprocket-wheel and over the other of said sprocket-wheels on said power-driven shaft, substantially as and for the purposes set forth.

In testimony that I claim the invention set forth above I have hereunto set my hand this 7th day of May, 1904.

STEPHEN H. HANSON.

Witnesses:
  FREDK. C. FRAENTZEL,
  GEO. D. RICHARDS.